United States Patent [19]

Takahashi

[11] Patent Number: 5,108,801
[45] Date of Patent: Apr. 28, 1992

[54] TRUCK CAP EDGE TRIM STRIP

[75] Inventor: Kenjiro Takahashi, Dearborn Heights, Mich.

[73] Assignee: The Standard Products Company, Cleveland, Ohio

[21] Appl. No.: 467,033

[22] Filed: Jan. 18, 1990

[51] Int. Cl.⁵ ............................................. B60R 13/04
[52] U.S. Cl. ....................................... 428/31; 24/292; 52/717.1; 52/718.1; 293/128; 428/99
[58] Field of Search ............... 24/292; 428/31, 99; 293/128; 52/717.1, 718.1

[56] References Cited

U.S. PATENT DOCUMENTS

| | | | |
|---|---|---|---|
| 3,857,601 | 12/1974 | Robbins | 296/10 |
| 3,923,334 | 12/1975 | Key | 296/10 |
| 4,036,521 | 7/1977 | Clenet | 296/100 |
| 4,079,986 | 3/1978 | Redford | 296/190 |
| 4,123,099 | 10/1978 | Mashigan | 296/10 |
| 4,613,181 | 9/1986 | Rafi-Zadeh | 296/100 |
| 4,629,243 | 12/1986 | Jensen | 296/100 |
| 4,648,649 | 3/1987 | Beal | 296/100 X |
| 4,756,571 | 7/1988 | Lake | 296/100 |
| 4,808,451 | 2/1989 | McCue et al. | 428/99 X |
| 4,813,735 | 3/1989 | Avitable | 296/100 |
| 4,815,787 | 3/1989 | Hale | 296/10 X |
| 4,828,315 | 5/1989 | Muirhead | 296/100 X |
| 4,911,971 | 3/1990 | McCue et al. | 428/99 |
| 4,946,727 | 8/1990 | Kessler | 428/99 |
| 4,948,637 | 8/1990 | Kessler | 428/99 X |

Primary Examiner—Henry F. Epstein
Attorney, Agent, or Firm—Harness, Dickey & Pierce

[57] ABSTRACT

A trim strip for application to the edge of a truck cap having a base plate to be attached directly to the truck cap and a top cover piece to fit into the base piece is provided. The base piece is made of a flexible material, contains a thin strip of aluminum and has means for accepting the top cover piece. The top cover piece is made of a flexible material and is bent to fit into the base piece.

12 Claims, 2 Drawing Sheets

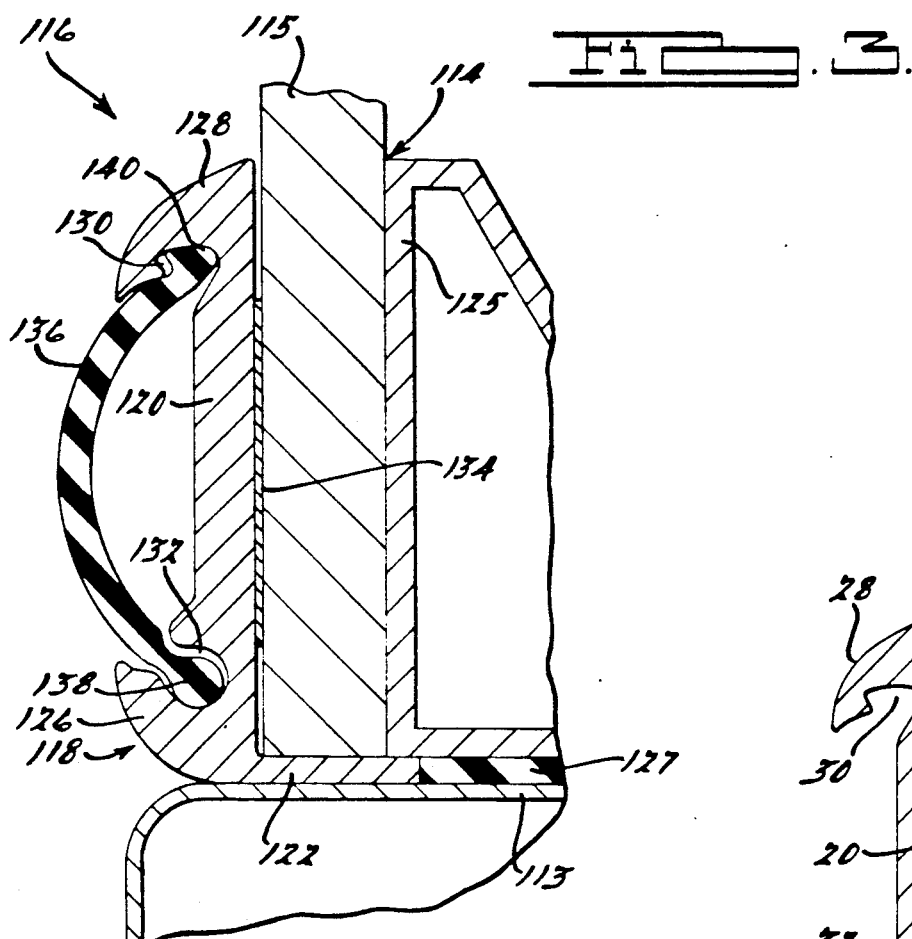
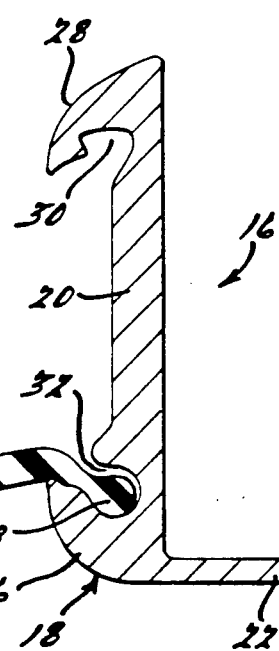
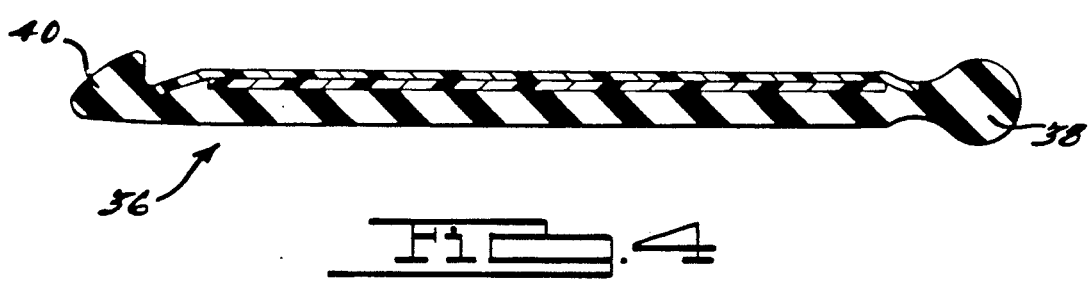

TRUCK CAP EDGE TRIM STRIP

BACKGROUND OF THE INVENTION

1. Field of the Invention

The present invention relates generally to decorative trim strips, and more particularly to a trim strip adapted for use along the edges and around the corners of a truck cap or the like to provide ornamentation and to protect the edge of the truck cap against minor damage such as scratching or pitting and to cover fasteners used to connect the trim strip to the truck cap.

2. Description of Related Art

Trim strips of various constructions have previously been provided for installation along the edge or panel of a motor vehicle for the dual purpose of protecting the edge or panel from damage and for a decorative effect. As for trim strips for the edge of truck caps, the current practice is to use a two-piece construction where the base piece that sits on the top railing of the truck bed is made of aluminum and a top piece made of polyvinyl chloride or a similar material is attached to the base piece. Holes are pre-drilled in the aluminum base piece to match up with the truck bed and the aluminum piece is then bent around the corner of the bed and screwed into the truck cap. The top piece made of polyvinyl chloride or the like is then attached to the base piece bending it into an overhang on the aluminum base so that the screws are not visible.

There are numerous disadvantages with this design. First of all, the trim strip must be bent around the corner of the truck bed and the aluminum base piece is hard to bend. Secondly, this aluminum piece tends to scratch easily, thus detracting from its decorative function. Thirdly, attaching the aluminum piece to the truck is a two-step process: holes must be pre-drilled in the aluminum base piece to match up with the bed (e.g., self-tapping screws cannot be used) and the aluminum piece must then be drilled onto the truck cap. Finally, using aluminum for the base piece requires an inventory of many different sizes of aluminum stock because different size aluminum pieces are used for different size truck beds. Also, the top piece has a tendency to come loose from the aluminum base piece because there is nothing to secure the top piece into the base piece.

SUMMARY OF THE INVENTION

In accordance with the present invention, a two-piece truck cap edge trim strip is provided wherein the base piece of the strip is made of a rubber, or plastic-like material, such as polyvinyl chloride, and the top piece is made of plastic material, such as polyvinyl chloride or similar material. A thin strip of aluminum is contained in the base piece to help the strip hold its integrity as it is bent around the corner of the bed and also to help hold the screw when the base piece is screwed to the truck cap. The base piece further has sockets at each end to accommodate the top cover piece of the edge trim. This top cover piece has a ball joint at one edge and a hook at the other edge to fit in the sockets of the base piece.

The present invention has many advantages over the prior construction and practice. First of all, since the base piece of the trim strip is made of rubber or a plastic-like material such as polyvinyl chloride, it can easily be bent around the corner of the truck bed. Secondly, the base piece will not scratch as easily as aluminum and it will therefore better serve its decorative function than the aluminum construction. Thirdly, this base piece can be screwed to the truck cap in one step, which will save installation time. A fastener such as a self-tapping screw, pop-rivet, or the like, can be used to go through the base piece of the edge trim and into the truck cap. There is no longer a need to pre-drill holes in the base piece to match up with the truck bed and then drill the base piece of the edge trim onto the truck cap. Fourthly, using rubber or plastic for the base piece of the trim strip will save money by keeping less inventory in stock. Different size strips will no longer have to be kept in stock to accommodate different bed sizes. A roll or coil of rubber and/or plastic can be kept in stock and different size pieces can be cut to fit any size truck bed. Also, the base piece of the present invention has a socket at each side to accommodate the top cover piece of the edge trim strip. These sockets allow for better securing of the top cover piece of the edge trim strip than the current construction. These and other advantages of the present invention will become apparent from the following disclosure taken in conjunction with the accompanying drawings.

BRIEF DESCRIPTION OF THE DRAWINGS

FIG. 3 is an enlarged end view of an alternative embodiment of the present invention of FIG. 2 where the thin aluminum strip is attached to the bottom of the base piece rather than contained in the base piece.

FIG. 4 is an enlarged cross-sectional view of the top cover of FIGS. 2 and 3.

FIG. 5 is a cross sectional view of the trim strip with the top piece partially removed.

DETAILED DESCRIPTION OF THE PREFERRED EMBODIMENT

Figure 1:
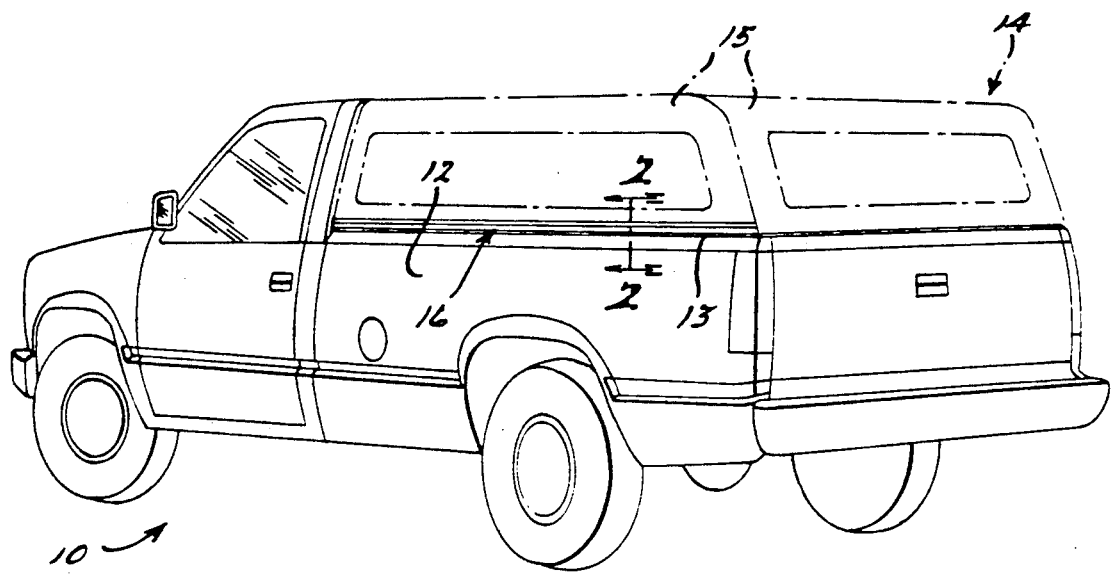
FIG. 1 is a perspective view of a truck including a trim strip attached to the truck cap in accordance with the present invention.

Referring now to the figures, FIG. 1 illustrates a vehicle 10. The vehicle 10 includes a truck bed 12 having a substantially horizontal top rail 13. A truck cap 14 having substantially vertical sides 15 normally rests on the top rail 13 of the truck bed 12. The present invention is an edge trim strip 16 which rests between the truck cap 14 and the top rail 13 of the truck bed 12.

Figure 2:
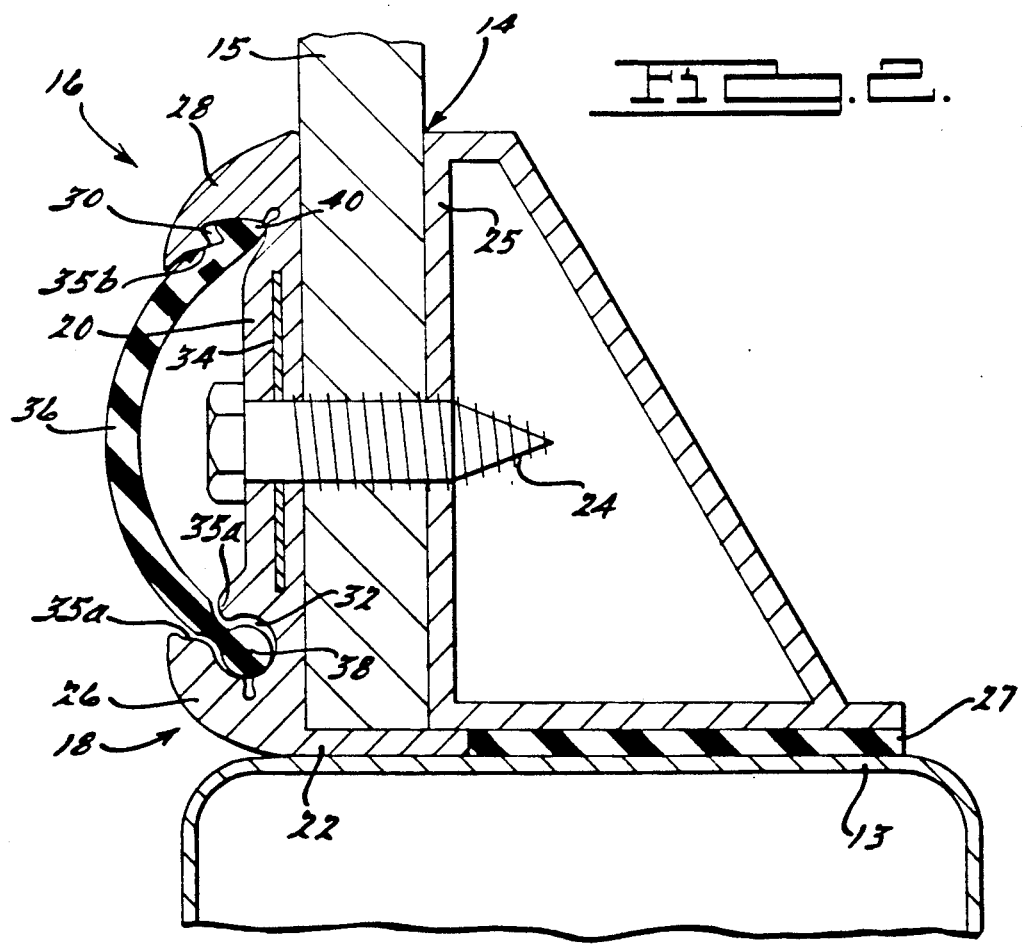
FIG. 2 is an enlarged cross-sectional view taken along line 2—2 in FIG. 1 illustrating the trim strip as it is screwed to the truck cap.

The edge trim strip 16 is attached to the vehicle 10 as shown in FIG. 2. The edge trim strip 16 has a base piece 18. This base piece 18 has a vertical portion 20 which is attached to the sides 15 of the truck cap 14 by a fastening means, such as screws 24 and a horizontal portion 22 which extends outwardly a sufficient distance to allow the side 15 of the truck cap 14 to rest on the horizontal portion 22 and gasket 27. The screws 24 extend through the side 15 and into a reinforcement member 25 of the truck cap 14. The base piece 18 may be made of a rubber or plastic material such as polyvinyl chloride to prevent the base piece 18 from scratching the outer surface of the top rail 13 and sides 15 of the truck cap 14. The base piece 18 has some degree of flexibility to allow the base piece 18 to be formed around a corner of the truck cap 14.

The vertical portion 20 of the edge trim strip 16 has generally C-shaped flanges 26 and 28 at each end which form sockets 30 and 32. The vertical portion 20 also contains a thin strip of metal such as aluminum 34 to help the base piece 18 hold its integrity as it is bent around the corner of the truck cap 14 and also to help secure the screw 24 which attaches the base piece 18 to the truck cap 14. It should be appreciated that the vertical portion 20 is formed about the strip 34, both of which extend longitudinally. The flange 26 has a pair of inwardly extending and rounded projections 35a which form a space having a width less than the diameter of socket 32. The flange 28 has an inwardly extending and generally V-shaped projection 35b. Projections 35a help to retain the ball joint 38 of the top cover piece 36. The hook 40 of the top cover piece cooperates with projection 35b to help secure ball joint 38.

FIG. 3 shows an alternative embodiment of the edge trim strip 16. Like parts have like numerals increased by one hundred (100). The edge trim strip 116 has the metal strip 134 attached below or between an inner surface and the side 15 of the truck cap 14 the vertical portion 120 of the base piece 118 rather than contained or enclosed in the vertical portion of the base piece.

Referring to FIGS. 2 and 4, the edge trim strip 16 also has a top cover piece 36. The top cover piece 36 is basically linear or planar and has a spherically shaped ball-joint 38 at one end and a V-shaped hook-joint 40 at the other end to help better secure the top cover piece 36 to the base piece 18. This top cover piece 36 can be made of rubber, a vinyl composition such as polyvinyl chloride, or metallized mylar.

FIGS. 2 and 3 show the top cover piece 36 as it is attached to the base piece 18. The ball-joint 38 and the hook 40 of the top cover piece fit into sockets 30 and 32 of the base piece to form a rounded surface. This surface helps protect against scratching and pitting and also to provide a decorative appearance.

The edge trim strip 16 is shipped in the configuration shown in FIG. 5. To assemble the edge trim strip, the base piece 18 is screwed to the truck cap and the top cover piece 36 is bent to allow the hook end 40 to fit into the empty socket 30 of the base piece.

What is claimed is:

1. A trim strip for the edge of a truck bed cap adapted to be attached to a truck bed having a peripheral upper rail therearound, said trim strip comprising:
   a horizontally elongated base portion composed of a flexible material and having an elongated bendable metal reinforcement strip secured thereto, said elongated base portion being bendable in at least one plane to conform to the peripheral upper rail of the truck bed;
   fastening means for securing said elongated base portion to a side of the truck bed cap adjacent a lower peripheral edge thereof; and
   a horizontally elongated cover strip adapted to be attached to said base portion after said base portion has been secured to the truck bed cap, said cover strip concealing said fastener means in an overlying relationship therewith when said cover strip is attached to said base portion,
   said base portion including an inwardly-directed, generally horizontal portion extending under the lower peripheral edge of the truck bed cap between the truck bed cap and the peripheral upper rail of the truck bed, an upwardly-directed, generally vertical portion of said base portion disposed against a side of the truck bed cap adjacent the lower peripheral edge thereof,
   said fastening means securing said vertical portion to the truck bed cap, and a pair of horizontally elongated, vertically spaced-apart upper and lower sockets on said base portion for receiving said horizontally elongated cover strip in a snapped-in relationship therewith,
   said cover strip having horizontally elongated enlarged portions on its upper and lower edges, said upper and lower enlarged portions being receivable in said upper and lower sockets respectively in a snapped-in engagement therewith, said fastening means being disposed between said upper and lower sockets on said base portion and concealed by said cover strip when said cover strip is snapped onto said base portion.

2. A trim strip according to claim 1, wherein said base portion is composed of a flexible synthetic material, said bendable metal reinforcement strip being encapsulated within said synthetic material.

3. A trim strip according to claim 2, wherein said fastening means extends through said base portion, through said reinforcing strip, and into the truck bed cap.

4. A trim strip according to claim 1, wherein said base portion is composed of a flexible synthetic material, said bendable metal reinforcing strip being disposed on an inner side of said base portion between said base portion and the truck bed cap.

5. A trim strip according to claim 4, wherein said fastening means extends through said base portion, through said reinforcing strip, and into the truck bed cap.

6. A trim strip according to claim 1, wherein one of said upper and lower enlarged portions of said cover strip is adapted to be snapped into the respective one of said upper and lower sockets on said base portion in an elongated ball-and-socket hinged relationship with one another, said cover strip thereby being hingedly rotatable into a position to allow the other of said upper and lower enlarged portions of said cover strip to be snapped into the respective other of said upper and lower sockets on said base portion after said base portion has been secured to the truck bed cap, thereby concealing said fastening means.

7. A trim strip according to claim 6, wherein said base portion is composed of a flexible synthetic material, said bendable metal reinforcement strip being encapsulated within said synthetic material.

8. A trim strip according to claim 7, wherein said fastening means extends through said base portion, through said reinforcing strip, and into the truck bed cap.

9. A trim strip according to claim 6, wherein said base portion is composed of a flexible synthetic material, said bendable metal reinforcing strip being disposed on an inner side of said base portion between said base portion and the truck bed cap.

10. A trim strip according to claim 9, wherein said fastening means extends through said base portion, through said reinforcing strip, and into the truck bed cap.

11. A trim strip according to claim 6, wherein said fastening means includes a number of threaded fasteners spaced horizontally along said base portion.

12. A trim strip according to claim 6, further including gasket means sealingly disposed between the truck bed upper peripheral rail and the truck bed cap at a location inward of said horizontal portion of said base portion.

* * * * *